United States Patent [19]

Benfaremo et al.

[11] Patent Number: 4,941,985
[45] Date of Patent: Jul. 17, 1990

[54] DISPERSANT/ANTIOXIDANT VII LUBRICANT ADDITIVE

[75] Inventors: Nicholas Benfaremo, Wappingers Falls; Maria M. Kapuscinski, Carmel; Theodore E. Nalesnik, Wappingers Falls, all of N.Y.

[73] Assignee: Texaco Inc., White Plains, N.Y.

[21] Appl. No.: 444,224

[22] Filed: Dec. 1, 1989

[51] Int. Cl.$^5$ ............................................ C10M 145/14
[52] U.S. Cl. ............................ 252/51.5 R; 252/51.5 A; 252/56 R; 525/330.5
[58] Field of Search ............... 252/51.5 R, 51, 51.5 A, 252/56 R; 525/330.5

[56] References Cited

U.S. PATENT DOCUMENTS

| | | | |
|---|---|---|---|
| 3,979,441 | 9/1976 | Hoke | 252/51 |
| 4,477,631 | 10/1984 | Danesi et al. | 525/133 |
| 4,707,519 | 11/1987 | Forti et al. | 525/133 |
| 4,745,134 | 5/1988 | Osei-Gyimah | 526/263 |
| 4,767,553 | 8/1988 | Hart et al. | 252/51.5 R |
| 4,780,228 | 10/1988 | Gardiner et al. | 252/51.5 A |
| 4,816,172 | 3/1989 | Kapuscinski et al. | 252/51 |
| 4,863,623 | 9/1989 | Nalesnik | 252/51.5 A |

*Primary Examiner*—Jacqueline V. Howard
*Attorney, Agent, or Firm*—Robert A. Kulason; James J. O'Loughlin; Vincent A. Mallare

[57] ABSTRACT

A dispersant/antioxidant bound VII polymethacrylate lubricant additive composition prepared by:
(a) combining a polyunsaturated monomer with ($C_1$–$C_{20}$) alkyl monomers and, optionally, a dispersant monomer in an oil solvent to provide an intermediate reaction mixture;
(b) stirring and purging the reaction mixture;
(c) heating the purged mixture and adding a radical polymerization catalyst to the purged mixture;
(d) heating the mixture to a sufficiently high temperature to remove any excess of the polymerization catalyst therefrom;
(e) (optionally) recovering the intermediate product polymethacrylate;
(f) combining the intermediate product with an aromatic nitroso compound to provide an intermediate reaction mixture;
(g) stirring and purging the intermediate reaction mixture; and
(h) recovering from the purged mixture the product polymethacrylate.

19 Claims, No Drawings

DISPERSANT/ANTIOXIDANT VII LUBRICANT ADDITIVE

BACKGROUND OF THE INVENTION

This invention relates to Viscosity Index Improvers (VII), and more particularly to an antioxidant bound Viscosity Index Improving polymethacrylate lubricant additive.

As is well known to those skilled in the art, lubricating oils for internal combustion engines typically contain a multitude of additives which function as detergents, dispersants, viscosity index improvers, pour depressants, etc., to improve the properties of the oil. It is found that it is particularly necessary to improve the resistance of a lubricating oil to oxidation.

In developing suitable additives for imparting various properties to lubricating oils, polymethacrylate polymers have been found to be useful for a variety of applications in lubricants. Some of their chief uses are as Viscosity Index (VI) improvers and pour point depressants (PPD's) for lubricants. The preparation of functionalized PMA's has increased in recent years. Many functionalized PMA's contain some amine functionality for the purpose of imparting dispersancy to the polymer. Other functionalized PMA's are also known, but to a lesser extent. There are, however, only a few examples of antioxidants being incorporated into the polymers. In developing PMA's which impart multifunctional properties to VII's and lubricants there has not been proved an adequate process for synthesizing a multifunctional PMA, incorporating antioxidants.

Thus, it is an object of the present invention to provide a method, i.e. a synthesis, for producing antioxidant polymethacrylates (PMA's).

DISCLOSURE STATEMENT

U.S. Pat. No. 4,036,766 discloses a complex reaction product of (I) an interpolymer of dialkylamino methacrylate, $C_1$–$C_6$ alkyl methacrylate, $C_{10}$–$C_{14}$ alkyl methacrylate and $C_{16}$–$C_{20}$ alkyl methacrylate monomers and (2) a liquid poly (alkene-1) of molecular weight between about 200 and 10,000 prepared by polymerizing the monomers comprising said interpolymer in the presence of said liquid poly (alkene-1). A mineral oil composition of improved viscosity, pour depressing and detergent-dispersant properties and concentrates thereof comprising between about 10 and 95 wt.% of a mineral oil of a lubricating viscosity and between about 0.1 and 90 wt. % of said complex product.

U.S. Pat. No. 4,606,834 discloses lubricating oil compositions which contain a VI improving (VII) pour point depressant. The VII consists essentially of a terpolymer where the monomers are selected from various ($C_{10}$–$C_{20}$) acrylates.

U.S. Pat. No. 4,098,709 discloses polymers containing post-reacted hindered phenol antioxidant functionality as viscosity index (VI) improvers for high temperature service, particularly for lubricating oils used in diesel engines.

Co-assigned U.S. Application No. 172,664 discloses a reaction product of an ethylene copolymer or terpolymer of a ($C_3$–$C_{10}$) alphamonoolefin and optionally a non-conjugated diene or triene on which has been grafted an ethylenically unsaturated carboxylic function which is then further derivatized with an amino-aromatic polyamine compound.

Co-assigned U.S. Application No. 07/419,407 discloses a dispersant/antioxidant bound, Viscosity Index-improving polymethacrylate composition having a molecular weight ranging from about 20,000 to about 2,500,000. The composition was comprised of a base oil and effective amounts of dispersant and antioxidant monomers.

Co-assigned U.S. Application No. 07/419,565 discloses an antioxidant bound Viscosity Index-improving polymethacrylate composition having molecular weight ranging from about 20,000 to about 2,500,000. The composition was comprised of a base oil and effective amounts of alkyl and antioxidant monomers.

SUMMARY OF THE INVENTION

The invention provides antioxidant and dispersant/antioxidant bound, Viscosity Index-improving polymethacrylate compositions having a molecular weights ranging from about 20,000 to about 2,500,000. The composition comprises a base oil and effective amounts of alkyl methacrylate monomers, a polyunsaturated monomer, an aromatic nitroso compound and, optionally, a dispersant monomer. The composition being prepared by:

(a) combining a polyunsaturated monomer with ($C_1$–$C_{20}$) alkyl monomers and (optionally) a dispersant monomer, in an oil solvent to provide an intermediate reaction mixture;

(b) stirring and purging the reaction mixture by nitrogen ebullition at about 200 ml/min for about 25–35 minutes;

(c) reducing the nitrogen ebullition to about 20 ml/min;

(d) heating the purged mixture to about 70° C.–85° C. and adding a radical polymerization catalyst to the purged mixture;

(e) increasing the temperature of the heated mixture to about 95° –105° C. and maintaining the mixture at such temperature for a sufficient period of time to remove any excess of the polymerization catalyst; and (f) (optional) recovering the intermediate product polymethacrylate;

(g) combining the intermediate polymethacrylate with an aromatic nitroso compound to provide an intermediate reaction mixture;

(h) stirring the intermediate reaction mixture 5 while purging the mixture with nitrogen at a rate of 20 ml/min for about 20-25 min;

(i) heating the reaction mixture to 120° C. and maintaining the mixture temperature for 30 min;

(j) increasing the temperature of the reaction mixture to !60° C. while collecting water over I.0 hours; and (k) recovering the product polymethacrylate.

DETAILED DESCRIPTION OF THE INVENTION

The present invention resides in antioxidant and dispersant/antioxidant bound, Viscosity Index Improving (VII) polymethacrylate lubricant additives comprising alkyl methacrylate monomers, a polyunsaturated monomer, an aromatic nitroso compound, and optionally, a dispersant monomer.

The polyunsaturated monomers that may be used to make the present lubricant additive may be selected from the group consisting of an acrylate, methacrylate, an acrylamide or a methacrylamide derived from acrylic acid or methacrylic acid or their derivatives, and an unsaturated alcohol, phenol or amine.

The polyunsaturated monomer that may be used is represented by the formula:

$$CH_2=\underset{R^1}{C}-\underset{\|}{\overset{O}{C}}-R^2$$

where $R^1$ is a lower chain alkyl, preferably methyl or ethyl and $R^2$ is an unsaturated moiety derived from an unsaturated alcohol or unsaturated amine such as oleyl alcohol, linoleic or linolinic alcohol, oleylamine, allyl alcohol or allylamine. $R^2$ may also be derived from unsaturated phenols such as p-hydroxy-α-alkylstyrene or p-hydroxy-β-alkylstyrene, and unsaturated amines such as p-amino-α-alkylstyrene or p-amino-β-alkylstyrene. Other polyunsaturated monomers may also be used; the only criterion being that one double bond of the monomer is substantially more reactive than the other double bond.

The dispersant monomer that may be used to produce the present lubricant may be a dialkylamino methacrylamide or acrylamide or methacrylate or acrylate where one amino group is a primary or secondary amine and the other amino group is a secondary or tertiary amine.

The acrylate or methacrylate monomers and alkyl acrylate or methacrylate monomers of the present invention are conveniently prepared from the corresponding acrylic or methacrylic acids or their derivatives. These acids can be synthesized using conventional methods and techniques. For example, acrylic acid is prepared by the acidic hydrolysis and dehydration of ethylene cyanohydrin or by the polymerization of β-propiolactone and the destructive distillation of the polymer to form acrylic acid.

Methacrylic acid is readily prepared by the oxidation of a methyl α-alkyl vinyl ketone with metal hypochlorites; the dehydration of α-hydroxyisobutyric acid with phosphorus pentoxide; or the hydrolysis of acetone cyanohydrin.

The alkyl acrylate or methacrylate monomers of the present invention are conveniently prepared by reacting the desired primary alcohol with the acrylic acid or methacrylic acid in a conventional esterification catalyzed by acid, preferably p-toluene sulfonic acid and inhibited from polymerization by MEHQ or hydroquinone. Suitable alkyl acrylates or alkyl methacrylates contain from about 1 to about 30 carbon atoms in the alkyl carbon chain. Typical examples of starting alcohols include methyl alcohol, ethyl alcohol, butyl alcohol, octyl alcohol, iso-octyl alcohol, isodecyl alcohol, undecyl alcohol, dodecyl alcohol, tridecyl alcohol, capryl alcohol, lauryl alcohol, myristyl alcohol, pentadecyl alcohol, palmityl alcohol or stearyl alcohol. It is to be noted that all of the starting alcohols described above can be reacted with acrylic acid or methacrylic acid to form desirable acrylates or methacrylates.

The copolymers useful in the practice of this invention can be prepared in a conventional manner by bulk, solution or emulsion polymerization methods using known catalysts. Thus, the copolymers utilized by this invention can be prepared from the corresponding monomers with a diluent such as water in a heterogeneous system, usually referred to as emulsion or suspension polymerization, or in a homogenous system with a solvent such as toluene, benzene, ethylene dichloride, or an oil solvent which is normally referred to as solution polymerization. Solution polymerization in benzene, toluene or an oil solvent having similar chain transfer activity is the preferred method used in forming the copolymers disclosed herein, because this method and solvent produce the preferred copolymers characterized by a relatively high molecular weight. Solvents normally comprise from about 10 to about 50 weight percent based on the weight of the copolymer.

The polymerization of the monomers uses suitable catalysts which include peroxide type free radical catalysts such as benzoyl peroxide, lauroyl peroxide, or t-butylhydroperoxide; and free radical catalysts such as 2,2-azobisisobutyronitrile. The catalysts, when used, are employed in concentrations ranging from a few hundredths of a percent to two percent by weight of the monomers. The preferred concentration is from about 0.2 to about 1.0 percent by weight of the monomers.

Copolymerization of the monomers used herein takes place over a wide temperature range depending upon the particular monomers and catalyst utilized in the reaction. For example, copolymerization can take place at temperatures as low as -103° F.(-75° C) or lower when metallic sodium in liquid ammonia is used as the catalyst. However, the copolymerization reaction is generally carried out at temperatures ranging from about 77° F.(25° C.) to about 302° F.(150° C.) when a catalyst such as 2.2-azobisisobutyronitrile is used. The copolymerization reaction is preferably carried out in an inert atmosphere, for example, argon or nitrogen to favor the formation of copolymers having relatively high viscosities and molecular weights.

Preferably, the copolymerization reaction is carried out to substantial completion so that the finished product is essentially comprised of the ratio of monomers introduced into the vessel. Normally, a reaction time of from about 1 to about 72 hours, preferably from about 1 to about 50 hours, is sufficient to complete the copolymerization process.

The copolymers disclosed herein have an average molecular weight of greater than about 20,000, especially a molecular weight range of from about 20,000 to about 300,000, preferably from about 80,000 to about 200,000. The molecular weight of the copolymer can conveniently be determined using conventional techniques.

The terpolymers of this invention may be formed from
(1) a first monomer $$CH_2=\underset{R^1}{C}-\underset{\|}{\overset{O}{C}}-R^2$$

(2) a second monomer $$CH_2=\underset{R^1}{C}-\underset{\|}{\overset{O}{C}}-R^3$$

and optionally (3) a third monomer $$CH_2=\underset{R^1}{C}-\underset{\|}{\overset{O}{C}}-A-R^4-N\underset{R^6}{\overset{R^5}{<}}$$

wherein
A is —NH—, —)—, or —S—;
$R^1$ is H or a lower alkyl group;

R² is an unsaturated alcohol, amine thiol or phenol residue;
R³ is a (C₁-C₂₀) alkyl group;
R⁴ is an alkylene group (—CH₂—)ₓ, x=0 to 10
R⁵ and R⁶ are alkyl, alkaryl, aralkyl, aryl or arylene groups.

Illustrative of the first monomers which may be employed are those provided below in Table I, the first listed being preferred.

TABLE I

| | |
|---|---|
| Neodol 25L | methacrylate |
| Alfol 1620 SP | methacrylate |
| Neodol 25L | acrylate |
| Alfol 1620 SP | acrylate |
| lauryl | methacrylate |
| lauryl | acrylate |
| lauryl | ethacrylate |
| decyl | methacrylate |
| decyl | acrylate |
| undecyl | methacrylate |
| undecyl | acrylate |
| tridecyl | methacrylate |
| tridecyl | acrylate |
| myristyl | methacrylate |
| myristyl | acrylate |
| pentadecyl | methacrylate |
| pentacecyl | acrylate |
| isodecyl | methacrylate |
| isodecyl | acrylate |
| stearyl | methacrylate |
| stearyl | acrylate |
| cetyl | methacrylate |
| cetyl | acrylate |
| methyl | methacrylate |
| methyl | acrylate |
| butyl | methacrylate |
| butyl | acrylate |

The NMA and the AMA monomers described above are respectively derived from Neodol 25L and Alfol 1620 SP which are trade names for technical grade alkanols, respectively, of Shell Chemical Co and Continental Oil Co. of the following typical analyses.

| Neodol 25L (Synthetic Lauryl Alcohol) | Typical Approx. Homolog Distribution, wt % |
|---|---|
| Lighter than C₁₂OH | 4 |
| C₁₂OH | 24 |
| C₁₃OH | 24 |
| C₁₄OH | 24 |
| C₁₅OH | 13 |
| C₁₆OH | 2 |

| Alfol 1620 SP (Synthetic Stearly Alcohol) | |
|---|---|
| C₁₄OH and lighter | 4 |
| C₁₆OH | 55 |
| C₁₈OH | 28 |
| C₂₀OH | 9 |

The third monomer which may be employed in practice of the process of this invention may be characterized by the formula

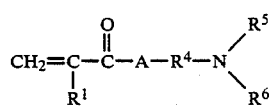

In the above formula R⁵ or R⁶ may be hydrogen or a hydrocarbon selected from the group consisting of alkyl, aralkyl, cycloalkyl, aryl, and alkaryl, including such radicals when inertly substituted. When R⁵ or R⁶ is alkyl, it may typically be methyl, ethyl, n-propyl, isopropyl, n-butyl, isobutyl, sec-butyl, amyl, octyl, decyl, octadecyl, etc. When R⁵ or R⁶ is aralkyl, it may typically be benzyl, betaphenyethyl, etc. When R⁵ or R⁶ is cycloalkyl, it may typically be cyclohexyl, cycloheptyl, cyclooctyl, 2-methylcycloheptyl, 3-butylcyclohexyl, 3-methylcyclohexyl, etc. When R⁵ or R⁶ is alkaryl, it may typically be tolyl, xylyl, etc. When R⁵ or R⁶ may be inertly substituted i.e. it may bear a non reactive substituent such as alkyl, aryl, cycloalkyl, ether, etc. Typically inertly substituted R⁵ or R⁶ groups may include 2-ethoxyethyl, carboethoxymethyl, 4-methyl cyclohexyl, etc. The preferred R⁵ or R⁶ groups may be lower alkyl, i.e., (C₁-C10) alkyl groups including e.g. methyl, ethyl, n-propyl, i-propyl, butyls, amyls, hexyls, octyls, decyls, etc. R⁵ or R⁶ may preferably be methyl.

In the above formula, R⁴ may be a hydrocarbon group selected from the group consisting of alkylene, aralkylene, cycloalkylene, arylene and alkarylene, including such radicals when inertly substituted. When R⁴ is alkylene, it may typically be methylene, ethylene, n-propylene, iso-propylene, n-butylene, i-butylene, sec-butylene, octylene, decylene, octadecylene, etc. When R⁴ is aralkylene, it may typically be benzylene, betaphenylethylene, etc. When R⁴ is cycloalkylene, it may typically be cyclohexylene, cycloheptylene, cyclooctylene, 2-methycycloheptylene, 3-butylcyclohexylene, 3-methylcyclohexylene, etc. When R⁴ is arylene, it may typically be phenylene, naphthylene, etc. When R⁴ is alkarylene, it may typically be tolylene, xylylene, etc. When R⁴ is arylene, it may typically be phenylene, naphthylene, etc. When R⁴ is alkarylene, it may typically be tolylene, xylylene, etc. R⁴ may be inertly substituted i.e. it may bear a non-reactive substituent such as alkyl, aryl, cycloalkyl, ether, etc. Typically inertly substituted R⁴ groups may include 2-ethoxyethylene, carboethoxymethylene, 4-methyl cyclohexylene, etc. The preferred R⁴ groups may be lower alkylene, i.e., (C₁-C₁₀) alkylene, groups including e.g. methylene, ethylene, n-propylene, i-propylene, butylene, amylene, hexylene, octylene, decylene, etc. R⁴ may preferably be propylene—CH₂CH₂CHJ₂—.

In the above formula, A may be —O—, —S—, or preferably —NH—.

Typical third monomers may be as set forth below in Table II, the first listed being preferred.

TABLE II

| | |
|---|---|
| N,N-dimethylaminopropyl | methacrylamide |
| N,N-diethylaminopropyl | methacrylamide |
| N,N-dimethylaminopropyl | acrylamide |
| N,N-diethylaminopropyl | acrylamide |
| N,N-dimethylaminoethyl | acrylamide |
| N,N-diethylaminoethyl | acrylamide |
| N,N-dimethylaminoethyl | methacrylamide |
| N,N-dimethylaminoethyl | acrylamide |
| N,N-dimethylaminoethyl | thiomethacrylamide |

The first monomer which is polyunsaturated may be an acrylate or methacrylate represented by the following formula:

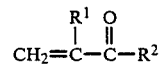

(a)

where $R^1$ is H or a alkyl group and $R^2$ is an amine or alcohol residue such as but not exclusively:

oleyl alcohol
oleyl amine
allyl alcohol
allyl amine
hydroxy styrene
amino styrene
hydroxy -α-methylstyrene
amino -α-methylstyrene
hydroxy -β-methylstyrene
amino -β-methylstyrene and other hydroxy and amino substituted olefins capable of reaction with aromatic nitroso compounds after polymerization.

(b) a diolefin wherein the diolefin has double bonds of different reactivities such as:

allyl styrene
oleyl styrene and other olefinically substituted styrenes and alkyl styrenes; or (c) a polyunsaturated heterocycle capable of containing a reactive double bond after initial polymerization, such as:

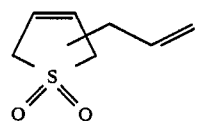

The second monomer when prepared commercially may in fact be a mixture obtained by use of a crude alcohol mixture during esterification. The carbon number of the monomer is that of the ester which is the predominant ester in the monomer. Commonly, the carbon number may be the weight average carbon number of the alcohol-derived alkyl group making up the esters.

The three component terpolymers of this invention may be prepared by contacting a mixture consisting essentially of first monomer, second monomer, and optionally the third monomer in the presence of a polymerization initiator-catalyst and chain transfer agent in an inert atmosphere in the presence of diluent. Typically 75–98 parts, preferably 90–98, say 92 of second monomer and 1–15 parts, preferably 2–10, say 4 parts of first monomer and 1–15, preferably 2–10, say 4 parts of third monomer may be added to the reaction operation.

The polymerization solvent may typically be an inert hydrocarbon, preferably hydrocarbon lubricating oil (typically N 100 pale oil) which is compatible with or identical to the lubricating oil in which the additive is to be employed present in amount of 5–50 parts, preferably 20–50 parts, say 40 parts per 100 parts of total reactants.

The Polymerization initiator-catalyst may be 2,2-azobisisobutyronitrile (AIBN), or a peroxide such as benzoyl peroxide, present in amount of 0.05–0.25 parts, preferably 0.1–0.2 parts, say 0.16 parts. Chain terminator may typically be ($C_8$–$C_{12}$) mercaptans, typified by lauryl mercaptan, present in amount of 0.10 parts, preferably 0.02–0.08 parts, say 0.06 parts.

Polymerization is carried out with agitation at 25° C.–150° C., preferably 50° C.–100° C., say 83° C, and 0–100 psig, preferably 0–50 psig, say 0 psig for 1–8 hours, say 3 hours. Reaction may be continued until two identical refractive indices are recorded.

The intermediate polymer is characterized by a molecular weight Mn of preferably 20,000–250,000, say 80,000. The component weight ratio of first, second and third monomer may be 75–98: 1–5: 1–15 say 92:4:4.

The polydispersity index (Mw/Mn) of these oil-soluble polymers may be 1–5, preferably 1.5–4, say 2.3.

In a typical reaction, the monomers are charged to the reactor together with polymerization solvent followed by chain terminator. Agitation and inert gas (e.g. nitrogen) flow are initiated. Polymerization initiator is added and the reaction mixture is heated to reaction temperature at which it is maintained until the desired degree of polymerization is attained. Diluent oil (if employed) is added to yield a lube oil concentrate containing about 25–80 wt%, preferably 35–70 wt%, say 40 wt% of the intermediate terpolymer.

The intermediate terpolymers prepared may be characterized by the formula:

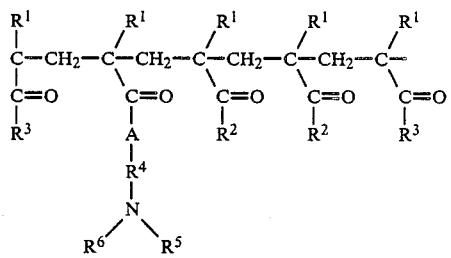

The intermediate polymer is then reacted with a reagent capable of reacting with the remaining unsaturated groups in the polymer and imparting antioxidant properties. Particularly, effective reagents are aromatic nitroso derivatives of hindered phenols and amines such as:

(a) 2,6-ditert-butyl-I,4-nitrosophenol

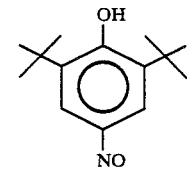

(b) nitrosoaromatic amines such as 4nitrosodiphenylamine

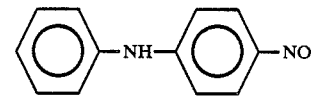

(c) 4-nitroso dimethylanaline

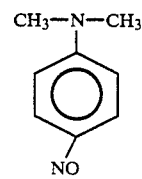

According to this invention, a hydrocarbon lubricating oil composition may comprise a major effective portion of a hydrocarbon lubricating oil and a minor effective portion of the additive polymer. The minor effective portion may typically be 0.01-10.0 parts. Preferably 0.1-8 parts, say 5.0 parts, per 100 parts of hydrocarbon lubricating oil. The total composition may also contain other additives typified by oxidation inhibitors, corrosion inhibitors, antifoamants, detergents, dispersants, etc.

Typical of the supplementary detergent-dispersants which may be present may be alkenylsuccinimides derived from polyisobutylene (Mn of 700-5000) overbased calcium alkyl aromatic sulfonate having a total base number of about 300; sulfurized normal calcium alkylphenolate; alkenyl succinimides; etc. as disclosed in U.S. Pat. Nos. 3,087,956; 3,549,534; and 3,537,966.

Typical of the antioxidants which may be present may be zinc or cadmium dialkyl dithiophosphates or dialkyldithiophosphates; alkylated diphenyl amines; sulfurized alkylphenols and phenolates, hindered phenols, etc.

Typical of the corrosion inhibitors which may be present may be zinc dialkyldithiophosphates, basic calcium, barium, or magnesium, sulfonates; calcium, barium, and magnesium phenolates, etc.

It is a feature of this invention that the novel lubricating oil compositions may be characterized by improved pour point when the novel additives are present in amount of 0.05-5.0 wt%, preferably 0.1-0.7 wt%, say 0.3 wt% of the lubricating oil.

Typically it may be possible to treat a base lubricating oil of pour point of $-12°$ C., by addition of only 0.3 wt% of additive to yield a product having a pour point of minus 36° C. Pour point is commonly measured by ASTM D-97.

When used as a pour point depressant, it is preferred that the molecular weight (Mn) of the polymer be 20,000-120,000, preferably 20,000-80,000, say 20,000.

It is also a feature of this invention that the novel additives may be used as dispersancy improvers when the third monomer is present, in lubricating oil compositions in effective amount of 3.0 wt%-10.0 wt%, preferably 4.0 wt% to 8.0 wt%, say 5.0 wt%. When dispersancy is primarily desired, the molecular weight (Mn) of the polymer may be 20,000-120,000, say 80,000.

The novel additives of this invention may impart viscosity index improvement to lubricating oils when present in amount to 0.25 wt%-10.0 wt%, preferably 2 wt%-8 wt%, say 5.0 wt%. When they are employed primarily as viscosity index improvers, the molecular weight (Mn) may be 20,000-150,000, preferably 40,000-120,000, say 80,000. The Viscosity Index is measured by ASTM D-2270.

It is a feature of the terpolymer additives of this invention (which consist essentially of first, second and third monomer components) that they unexpectedly provide improvements in pour dispersancy, dispersancy, and viscosity index, i.e. they may be used, either in whole or in part, to provide all of these functions. When it is desired to utilize the novel additive to provide all three of these functions, it is preferred that the additive be present in amount of 1.0-8.0 wt%, say 5.0 wt% of the lubricating oil composition. In this instance the molecular weight Mn may be 20,000-120,000, preferably 40,000-90,000, say 80,000.

In order to show the advantages of the present invention the following Examples are provided as being representative of the best mode of how to practice the invention described herein and not intended to limit the scope thereof.

EXAMPLE I

Preparation of Oleyl Acrylate

To a 500 ml round bottom flask equipped with a stirrer, condenser, water trap and thermometer, was added oleyl alcohol (100 g, 0.373 moles), acrylic acid (27 g, 0.373) moles), p-toluenesulfonic acid monohydrate (1g, 1 wt%, hydroquinone (0.2 g, 0.2 wt%) and xylene (100 ml). The reaction mixture was heated to reflux and maintained until no more water was collected (~4 hrs). The xylene solution was then concentrated to about half of its original volume. The crude product was then washed successively with water, saturated sodium bicarbonate solution, and then again with water. The organic solution was dried over sodium sulfate, filtered and the solvent evaporated under reduced pressure. The product was stabilized by 0.01 wt% of MEHQ. The yield was 80%.

EXAMPLE II

Preparation of 2,6-ditert-butyl-4-nitrosophenol

In a 500 ml round flask equipped with a thermometer, stirrer and nitrogen inlet was added 2,6-ditertbutylphenol (50 g, 0.243 moles) and ethanol (95%, 100 ml). The solution was stirred until all of the phenol dissolved. The solution was then cooled to 0° C and concentrated hydrochloric acid (26.3 g, 0.267 moles) was slowly added. A solution of sodium nitrite (17.56 g, 0.254 moles) in water (75 ml) was then added dropwise so as to keep the temperature of the reaction between 0 °and 10° C. (1 hr). The solution became quite thick and more ethanol was added accordingly, for efficient stirring. After the addition was completed, the reaction mixture was stirred for 1 hr and it was then poured into a beaker of ice water (~5 L). The yellow green precipitate was filtered off washed, with water and air dried. The yield was 98 wt%. (210-213° C.).

EXAMPLE III(a)

Preparation of the Base Dispersant Polymethacrylate

To a 1000 ml resin kettle equipped with a thermocouple, thermometer, condenser and heavy duty stirrer, was added N,N-dimethylaminopropyl methacrylamide (8 g,4 wt.%), oleyl acrylate (8 g,4 wt.%), butyl methacrylate (20g, 10 wt.%), neodol 25L methacrylate (152 g, 76 wt.%), alfol SP 1620 methacrylate (12 g, 6 wt.%) and an oil solvent (N100 Pale Oil, 43 g). The reaction mixture was stirred and purged by nitrogen ebullition for 30 min at 20 ml/min. The mixture was then heated to 80° C by means of an heat lamp, and dodecyl mercaptan (0.2 g) and AIBN (0.4 g) were then added. After 4 hrs, the reaction temperature was increased to 100° C. and maintained for 1 hr to destroy any excess AIBN.

The intermediate polymer product is typically diluted in the reaction vessel with N55 Pale Oil (214 g) to give a final concentration of ~40% in oil.

EXAMPLE III(b)

Preparation of Non-Dispersant Base PMA

Using the procedure of Example III(a) above, the following monomers were polymerized to prepare the nondispersant base polymer.

| Monomer | Wt. % |
|---|---|
| Oleyl acrylate | 4.0 |
| Butyl Methacrylate | 10.0 |
| Neodol 25L Methacrylate | 80.0 |
| Alfol 1620 SP Methacrylate | 6.0 |

EXAMPLE IV

Preparation of the Dispersant - Antioxidant PMA (DAOPMA)

In a 250 ml round bottom flask equipped with thermometer, stirrer and nitrogen inlet, was added the base dispersant polymethacrylate of Example III(a) (I50 g) and the 2,6-ditert-butyl-4-nitrosophenol. The mixture was stirred and heated at 120° C. for 30 min. The temperature was then increased to 160° C. and maintained for an additional hour while water was removed from the system. The product was cooled to about 60° C. and isolated.

EXAMPLE V

Preparation of the Dispersant-Antioxidant PMA (DAOPMA)

In a 250 ml round bottom flask equipped with thermometers, stirrer and nitrogen inlet, was added the base dispersant polymethacrylate of Example III(a) (100 g, 4.96 mmoles) and the 4-nitroso diphenylamine (I g, 4.97 mmoles). The reaction mixture was stirred and heated at 120° C. for 30 minutes. The temperature was then increased to I60° C. and maintained for an additional hour while water was removed from the system. The product was cooled to about 60° C. and then isolated.

EXAMPLE VI

Preparation of Antioxidant Polymethacrylate (AOPMA)

In a 250 ml round bottom flask equipped with thermometer, stirrer and nitrogen inlet, was added the base polymethacrylate of Example III(b) (100 g, 4.96 mmoles) and the 4-nitroso diphenylamine (1 g, 4.97 mmoles). The reaction mixture was stirred and heated at 120° C. for 30 minutes. The temperature was then increased to 160° C. and maintained for an additional hour while water was removed from the system. The product was cooled to about 60° C and then filtered.

|  | Example III (a) | Example IV |
|---|---|---|
| Typical Analyses | | |
| Kin. Vis. 40° C. | 89.6 | 88.5 |
| Kin. Vis. 100° C. | 12.26 | 12.22 |
| Refractive Index 80% conc. (48.3° C.) | 1.4668 | — |
| % Nitrogen | | 0.37 |
| Additional Tests | | |
| Pour Point (1) | | −36° C. |

(1) A 5% blend of polymer in Base oil with a pour point of −13° C.

Evaluation of Antioxidant Properties

A Bench Oxidation Test (BOT) was used to measure the antioxidant properties of the polymer. This test measures the relative increase of the carbonyl absorption band of 1710 cm$^{-1}$ of an oxidized oil, over that of the starting material.

BOT TEST PROCEDURE

The test is conducted in a 2 L, 4-neck resin kettle equipped with a thermometer, condenser, gas bubbling tube and a mechanical stirrer. The polymer (3.75 wt% of a 40 wt% concentrate) was added along with !235 g of SNO-7 oil. The reaction mixture was stirred and purged with nitrogen for 30 min. The solution was then heated to 150° C. and initial samples were taken (0 hr. samples). The oxidation is started by switching from a nitrogen purge to one of air at a rate of 500 ml/min. The stirring rate is kept between 675 and 700 rpm's. Samples are taken periodically using a syringe and evacuated test tubes. They are then quickly stored in a refrigerator to quench the oxidation. BOT DIR values are obtained by using a Differential Infrared technique (DIR) in which the carbonyl absorption band at 1710 cm$^{-1}$ of the zero hour sample, is subtracted from that of the final product (144 hrs.).

The SNO-7 will give a DIR of −7 if no antioxidant is used, so values less that 7 are considered indicative of antioxidant properties. In Example 1, a DIR of 1.77 was obtained. The dispersant properties of the polymer product were determined by a Bench Sludge Test (BST) as described below.

Evaluation of Dispersancy Properties

The dispersancy of the additives was evaluated in the Bench Sludge Test (BST) which measures the ability of a dispersant to solubilize particles in the oil. This test is conducted by heating the test oil mixed with a synthetic hydrocarbon blowby and a diluent oil at a fixed temperature for a fixed time period. After heating, the turbidity of the resulting mixture is measured. A low percentage turbidity (0-10) is indicative of good dispersancy while an intermediate value (20-40) indicates intermediate dispersancy and a high value (40-100) indicates an increasingly poor dispersancy. The additives were tested at a 4.85 wt% treating dosage in an SAE 10W-30 formulation and compared to good, fair and poor references as provided below in Table IV.

| BOT AND BST RESULTS | | | | | |
|---|---|---|---|---|---|
| POLYMER | CONCENTRATION | % AO GRAFT | % DISPERSANT GRAFT | DIR | BST (1) |
| Example III (a) Base polymer | 1.5% Polymer | 0.0 | 4.0 | 17.21 | 37.5 |
| Example IV DAOPMA | 1.5% Polymer | 4.0 | 4.0 | 8.21 | 32.0 |
| Example V DAOPMA | 1.5% Polymer | 4.0 | 4.0 | 0.00 | 35.0 |
| Example VI | 1.5% Polymer | 4.0 | 0.0 | 0.72 | 93.4 |

BOT AND BST RESULTS

| POLYMER | CONCENTRATION | % AO GRAFT | % DISPERSANT GRAFT | DIR | BST (1) |
|---|---|---|---|---|---|
| AOPMA | | | | | |

(1) BST results were obtained on 4.85 wt % concentrates of the polymer concentrate in a fully formulated oil containing no dispersant.

In the formulation of an oil, a low pour point is important. According to the present invention, the pour point may be lowered from about $-25°$ C. to about $-40°$ C. The procedure for evaluating the pour point depressant properties is provided below.

Evaluation of Pour Point Depressant Properties

The pour point of an oil is measured by the ASTM D-97 test. Pour point depressants are evaluated at how much they depress the pour point of an oil. A particular base oil has a pour point of $-b\ 12°$ C. The addition of a commercial pour point depressant at 5.0 wt% effectively lowers the pour point of the base oil to $-30°$ C. The product of the Example, however, effectively lowers the pour point of the base oil to about $-42°$ C. when used at 5.0 wt%.

We claim:

1. A dispersant/antioxidant bound, Viscosity Index-improving polymethacrylate composition, having a molecular weight ranging from about 20,000 to about 2,500,000, said compositions comprising a base oil and effective amounts of alkyl, methacrylate monomers, a polyunsaturated monomer, an aromatic nitroso compound and, optionally, a dispersant monomer, said composition being prepared by:
   (a) combining a polyunsaturated monomer with ($C_1$-$C_{20}$) alkyl monomers and (optional) a dispersant monomer, in an oil solvent to provide an intermediate reaction mixture;
   (b) stirring and purging said reaction mixture by nitrogen ebullition at about 200 ml/min. for about 25 to about 35 minutes;
   (c) reducing the nitrogen ebullition to about 20 ml/min.;
   (d) heating the purged mixture to about 70° C. to about 85° C. and adding a radical polymerization catalyst to the purged mixture;
   (e) increasing the temperature of said heated mixture to about 95°–105° C. and maintaining said mixture at such temperature for a sufficient period of time to remove any excess of said polymerization catalyst; and
   (f) (optional) recovering the intermediate product polymethacrylate;
   (g) combining said intermediate product polymethacrylate with an aromatic nitroso compound to provide an intermediate reaction mixture;
   (h) stirring said intermediate reaction mixture while purging with nitrogen at a rate of 20 ml/min for about 20 to about 25 min.;
   (i) heating said reaction mixture to about 120° C. and maintaining said temperature for about 30 min.;
   (j) increasing the temperatue of the reaction mixture to about !60° C while collecting water over about 1.0 hour; and
   (k) recovering the product polymethacrylate.

2. The dispersant/antioxidant polymethacrylate composition of claim 1, wherein the antioxidant moiety is selected from the group consisting of a polyunsaturated acrylate, methacrylate, acrylamide or a methacrylamide derived from acrylic acid or methacrylic acid or their derivatives, and with an aromatic nitroso compound.

3. The polymethacrylate composition of claim 1 wherein the dispersant monomer is a diamine alkyl methacrylamide or methacrylate where one amino group is a primary or secondary amine and the other amino group is a secondary or tertiary amine.

4. The polymethacrylate composition of claim 2 wherein the nitroso compound is a nitroso diphenylamine or an alkyl derivative thereof.

5. The composition of claim 2 wherein said nitroso compound is 2,6-ditert-butyl-4-nitrosophenol.

6. The composition of claim 2 wherein said nitroso compound is 2,6-dimethyl-4-nitrosophenol.

7. The composition of claim 2 wherein said amino alkyl methacrylamide is dimethylaminopropyl methacrylamide.

8. The composition of claim 2 wherein the polyunsaturated monomer of said polymethacrylate is oley methacrylate.

9. The composition of claim 2 wherein the dispersant additive is N-vinyl-2-pyrolidone.

10. The composition of claim 2 wherein the polyunsaturated monomer is allyl methacrylate.

11. The composition of claim 2 wherein the polyunsaturated monomer is an unsaturated styrene derivative.

12. The composition of claim 2 wherein the nitroso compound is 4-nitroso diphenylamine.

13. The composition of claim 2 wherein the nitroso compound is N,N-dimethyl-4-nitroso aniline.

14. The compound of claim 2 wherein the nitroso compound is N,N-diethyl-4-nitroso aniline.

15. The composition of claim 1 wherein the pour point of said composition ranges from about $-25°$ C. to about $-40°$ C.

16. The composition of claim 10, wherein the pour point is about $-42°$ C.

17. The composition of claim 1 wherein the radical polymerization catalyst is selected from the group consisting of 2,2-Azobisisobutyronitrile, dicumylperoxide and benzoyl peroxide.

18. The composition of claim 1 wherein the ($C_1$-$C_{20}$) alkyl monomers are selected from the group consisting of methyl, butyl, lauryl and stearyl alcohols.

19. The composition of claim 2 wherein said nitroso compound is nitrosophenothiazine.

* * * * *